US006927823B1

(12) United States Patent
Reznikov et al.

(10) Patent No.: US 6,927,823 B1
(45) Date of Patent: Aug. 9, 2005

(54) METHOD FOR ALIGNMENT OF LIQUID CRYSTALS USING IRRADIATED LIQUID CRYSTAL FILMS

(75) Inventors: Yuriy Reznikov, Kyiv (UA); John West, Munroe Falls, OH (US); Oleg Yaroshchuk, Kyiv (UA)

(73) Assignee: Kent State University, Kent, OH (US)

( * ) Notice: Subject to any disclaimer, the term of this patent is extended or adjusted under 35 U.S.C. 154(b) by 75 days.

(21) Appl. No.: 09/656,742

(22) Filed: Sep. 7, 2000

(51) Int. Cl.$^7$ .......................................... G02F 1/1337
(52) U.S. Cl. ............................................ 349/124
(58) Field of Search ........................... 349/123, 124, 349/153, 127

(56) References Cited

U.S. PATENT DOCUMENTS

| 4,542,960 A | * | 9/1985 | Yang ........................... 349/141 |
| 4,974,941 A |   | 12/1990 | Gibbons et al. |
| 5,032,009 A |   | 7/1991 | Gibbons et al. |
| 5,389,698 A |   | 2/1995 | Chigrinov et al. |
| 5,528,401 A | * | 6/1996 | Narutaki et al. ............ 349/124 |
| 5,807,498 A |   | 9/1998 | Gibbons et al. |
| 5,929,957 A | * | 7/1999 | Noh ............................ 349/127 |
| 6,184,958 B1 | * | 2/2001 | Lim et al. .................... 349/124 |
| 6,368,681 B1 | * | 4/2002 | Ogawa ....................... 428/1.23 |
| 6,407,789 B1 | * | 6/2002 | Gibbons et al. ............ 349/124 |
| 6,449,028 B1 | * | 9/2002 | Grupp et al. ............... 349/191 |

OTHER PUBLICATIONS

A. Dyaduska, et al., Ukr. Fiz. Zh. 36, 1059 (1991).
T. Marusii and Yu. Reznikov, "Photosensitive Orientants for Liquid Crystal Alignment," Mol. Mat. 1993, Gordon and Breach Science Publishers, p. 161–168.

M. Schadt, et al., "Surface–Induced Parallel Alignment of Liquid Crystals by Linearly Polymerized Photopolymers," Jpn. J. Appl. Phys, vol. 31 ( No. 7), p. 2155–2164, ( Mar. 7, 1992).
J. Chen et al., "Model of Liquid Crystal Alignment by Exposure to Linearly Polarized Ulraviolet Light," Physical Review E, The American Physical Society, vol. 54 ( No. 2).
Jae–Hoon Kim et al., "Alignment of Liquid Crystals on Polyimide Films Exposed to Ultraviolet Light," Physical Review E, The American Physical Society, vol. 57 ( No. 5), ( Dec. 6, 1998).
Shao–Tang Sun et al., "Alignment of Guest–Host Liquid Crystals With Polarized Laser Light," Liquid Crystals, Taylor & Francis Ltd., vol. 12 ( No. 5), p. 869–874, ( Jun. 17, 1992).
Dmitry Voloshchenko et al., "Control of an Easy–Axis on Nematic–Polymer Interface by Light Action to Nematic Bulk," Jpn J. Appl. Phys., p. 556–571, ( Feb. 6, 1995).
G. Magyar et al., "Light Induced LC Alignment on the Isotropic Non–Photosensitive Surface," Mol. Cryst. Liq. Cryst., p. 71–79, ( Dec. 6, 1999).
G. Baur, et al., "Determination of the Tilt Angles at Surfaces of Substrates in Liquid Crystal–Cells," Physics Letters, vol. 56A ( No. 2), p. 142–144, ( Mar. 8, 1976).

(Continued)

*Primary Examiner*—Toan Ton
(74) *Attorney, Agent, or Firm*—Scott M. Oldham; Hahn Loeser + Parks LLP

(57) ABSTRACT

A method is provided for forming an alignment layer for a liquid crystal cell that is made from a liquid crystal film that has been irradiated with light. The method includes the steps of disposing a liquid crystal film on a substrate and then irradiating the liquid crystal film with light. Also, a liquid crystal display that includes an alignment layer that is a liquid crystal film that has been irradiated with light.

24 Claims, 4 Drawing Sheets

OTHER PUBLICATIONS

P. Ziherl, et al., "Magnetic Field Controlled Optical Phase Retardation in a Hybrid Nematic Cell," Liquid Crystals, Taylor & Francis Ltd., vol. 24 ( No. 4), p. 607–612, ( Dec. 6, 1976).

Y. R. Shen, "Surface Properites Probed by Second–Harmonic and Sum–Frequency Generation," Nature, vol. 337 ( No. 9), p. 519–525, (Feb. 6, 1989).

Hidetoshi Tomita, et al., "Command Surfaces 15 [1]. Photoregulation of Liquid Crystal Alignment by Cinnamoyl Residues on a Silica Surface," Liquid Crystals, vol. 20 ( No. 2), p. 171–176, (Dec. 6, 1996).

H. Lackmann, et al., "Photoreorientation of Nonisomerizing Diphenyldiacetylene Chromophores in LB Films of a Polyelectrolyte Complex–" Proceedings of the ECOF–7 (Potsdam, Germany), p. 169, ( Dec. 6, 1988).

W. Chen, et al., "Investigation of Anisotropic Molecular Orientation Distribution of Liquid–Crystal Monolayers by Optical Second–Harmonic Generation," Physical Review Letters, The America Physical Society, vol. 63 ( No. 24), p.

Y. R. Shen, "Optical Second Harmonic Generation at Interfaces," Annu. Rev. Phys. Chem., p. 327–350, ( Dec. 6, 1989).

Byoungchoo Park, et al., "Anisotropic Orientational Disbutions of Liquid Crystal Monolayers on Photo–Isomerizable Alignment Polymer Films," Journal–Korean Physical Society, vol. 30 ( No. 2), p. 202–208, ( Apr. 6, 1997).

M. I. Barnik, et al., "Optical Second Harmonic Generation in Various Liquid Crystalline Phases," Mo. Cryst. Liq. Cryst., Gordon and Breach, Science Publishers (USA), p. 1–12, ( Dec. 6, 1983).

J. E. Proust, et al., "Orientation of a Nematic Liquid Crystal by Suitable Boundary Surfaces," Solid State Communications, Pergamon Press (Great Britain), p. 1227–1230, ( Dec. 6, 1972).

K. Hiltrop, et al., "Contact Angles and Alignment of Liquid Crystals on Lecithin Monolayers," Mol. Cryst. Liq. Cryst., Gordon and Breach Science Publishers, p. 61–65, ( Dec. 6, 1978).

K. Hiltrop, et al., "On the Orientation of Liquid Crystals by Monolayers of Amphiphilic Molecules," Ber. Bunsen–Ges. Phys. Chem., p. 582–588, ( Dec. 6, 1981).

M. Dumont, "Alignment and Orientation of Chromophores by Optical Pumping," Nonlinear Optics, Overseas Publishers, p. 327–358, ( Dec. 6, 1995).

S. P. Palto, et al., "Photoinduced Optical Anisotropy in Langmuir Blodgett Films as a New Method of Creating Bistable Anchoring Surfaces for Liquid Crystal Orientation," J. Phys. II—France, p. 133–142, ( Dec. 6, 1995).

A. G. Tereshchenko, et al., "Photoinduced Optical Anisotropy in Azopolymer Films," Spectrosc., Interperiodica Publishing, vol. 83 ( No. 5), p. 747–751, ( Dec. 6, 1997).

Kunihiro Ichimura, et al., "Photo–optical Liquid Crystal Cells Driven by Molecular Rotors," Appl. Phys. Lett., vol. 63 ( No. 4), p. 449–451, ( Dec. 6, 1993).

Yuriy Reznikov et al., "Photoalignment of Liquid Crystals by Liquid Crystals," Physical Review Letters, vol. 84 ( No. 9), p. 1930–1933, ( Feb. 28, 2000).

Yuriy Reznikov et al., "Bulk– and Surface–Mediated Photoalignment of Liquid Crystals by Liquid Crystals," International Conference for Optics of Liquid Crystals, Puerto–Rico, Sep. 25–30, 1999.

* cited by examiner

METHOD FOR ALIGNMENT OF LIQUID CRYSTALS USING IRRADIATED LIQUID CRYSTAL FILMS

GOVERNMENT RIGHTS IN THE INVENTION

The United States government has a paid-up license in this invention and may have the right in limited circumstances to require the patent owner to license others on reasonable terms as provided for by the terms of Grant DMR89-20147, awarded by the National Science Foundation.

FIELD OF THE INVENTION

The present invention is directed to alignment of liquid crystals using an alignment layer. More particularly, the invention is directed to alignment layers of irradiated liquid crystal films.

BACKGROUND OF THE INVENTION

Liquid crystals consist of anisotropic molecules. The average direction of the long molecular axis is called the director, d. The director orientation is determined by the anchoring of the liquid crystal on rigid substrates and is characterized by the direction of the axis of easy director orientation, e, and anchoring energy W.

Reorientation of the director caused by the application of an external electric field is the basis of operation of liquid crystal displays. The basic unit of liquid crystal devices is a liquid crystal cell, which includes two rigid substrates with a liquid crystal sandwiched between. To obtain uniform brightness and high contrast ratio it is desired to produce a uniform alignment of liquid crystals in the cell.

To produce uniform planar orientation of liquid crystals, several techniques involving different polymer materials are generally used.

One technique is the rubbing method. Polymer layers are deposited on the substrate and rubbed unidirectionally. The director, d, is usually aligned parallel to the direction of rubbing in the plane of the substrate. A pretilt angle, $\phi$, between the substrate and the director in the plane perpendicular to the substrate may be produced by this method.

The rubbing method produces stable planar alignment with strong anchoring. However, this technique has some drawbacks. In particular, dust and static electricity generated during the rubbing can cause defects in liquid crystal displays. Moreover, it is difficult to orient selected regions of the liquid crystal surface locally so that each region has a different orientation. It is difficult to obtain multi-domain alignment.

Another technique is the photo aligning method. Photosensitive polymer layers are deposited on the substrate and are irradiated by polarized UV light. Such layers possesses a light induced anisotropy axis that produces high quality planar alignment of the liquid crystal molecules in a preferred axial direction perpendicular or parallel to the polarization vector of the UV light beam, E. Tilted alignment can be obtained by oblique irradiation of the polymer layer.

The photo aligning method produces stable planar and tilted alignment of most commercial nematic liquid crystals. In contrast to rubbing, no electrostatic charges or dust are produced on the aligning surface. Also, the direction of the easy axis and the anchoring energy can be locally varied by changing the direction of light polarization and the time of UV exposure.

An example of the photo aligning method can be found in U.S. Pat. No. 5,389,698 to V. Chigrinov et al, which uses a photopolymer polyvinyl-cinnamate aligning layer irradiated with plane-polarized light. Another example of the photo aligning method can be found in U.S. Pat. No. 5,807,498 to Gibbons et al, which uses polyimides with di-aryl ketones and di-aryl ketones alignment layers.

Both of the above methods use special polymer materials to produce the alignment of the liquid crystals.

Another method uses light irradiation of a liquid crystal cell filled with dye-doped liquid crystals. This method can produce planar alignment of liquid crystals (Jap.Journ.Appl.Phys. v.34 (1995) 566). The mechanism of the alignment is postulated to be a result of absorption of the light by the dye molecules followed by their anisotropic adsorption onto the substrate. This method, however, requires the use of dye-doped liquid crystals to form an alignment layer.

U.S. Pat. No. 5,032,009 to Gibbons et al. discloses exposing anisotropically absorbing molecules that are on a substrate, disposed in a liquid crystal medium, and the liquid crystals themselves to linearly polarized light. However, non-mesogenic molecules, such as a polyimide, are coated onto the substrate and exposed to linearly polarized light to produce alignment.

What is needed in the art is an alignment layer that can be formed from light irradiated liquid crystals.

It is therefore an object of the invention to provide a method of forming an alignment layer made from a liquid crystal film that is irradiated with light.

It is another object of the invention to provide a method of forming a liquid crystal cell that has at least one alignment layer made from a liquid crystal film that is irradiated with light.

SUMMARY OF THE INVENTION

The present invention provides a method for forming a liquid crystal alignment layer comprising: disposing liquid crystals in a solvent; depositing the liquid crystals and solvent on a substrate; removing the solvent to form a liquid crystal film; and irradiating the liquid crystal film with light wherein the wavelength of the light overlaps the absorption spectrum of the liquid crystal.

Also provided is a method of forming a liquid crystal cell comprising: providing two opposed substrates each covered with an electrode; disposing liquid crystals in a solvent; depositing the liquid crystals and solvent on at least one of the electrode covered substrates on the surface facing the other substrate; removing the solvent to form a liquid crystal film; irradiating the liquid crystal film with light wherein the wavelength of the light overlaps the absorption spectrum of the liquid crystal; placing spacers between the substrates; sealing three of the sides of the substrate to form a cell; filling the cell with a second liquid crystal; and sealing the cell.

Also provided is a liquid crystal display comprising a first and second cell wall structure, electrodes disposed on facing sides of said first and second cell wall structures, an alignment layer disposed on at least one of said electrodes, and first liquid crystals disposed within a space between the first and second cell wall structures, wherein the alignment layer comprises a liquid crystal film comprising second liquid crystals, wherein the liquid crystal film has been irradiated with light that overlaps the absorption spectrum of the second liquid crystals.

DETAILED DESCRIPTION OF THE INVENTION

Figure 1:
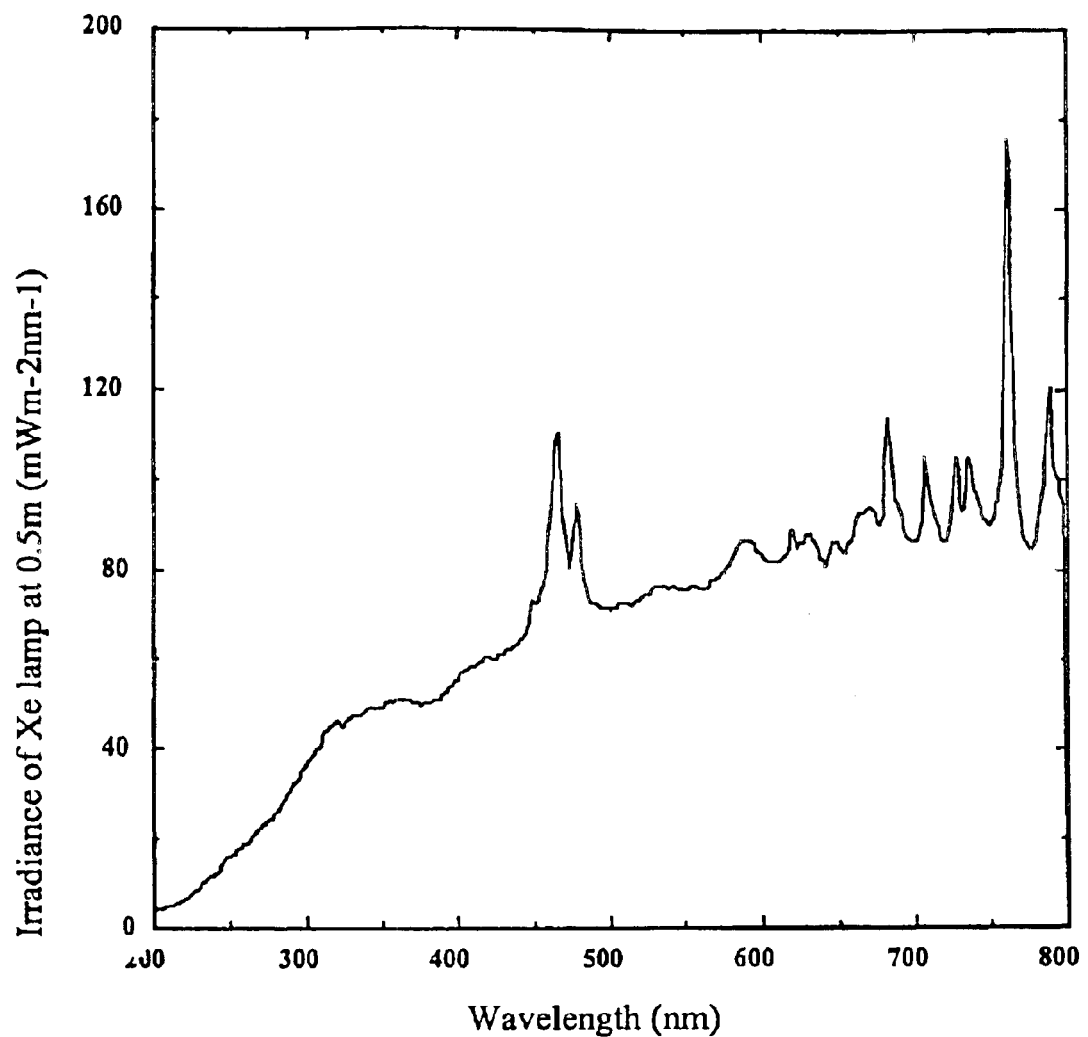
FIG. 1 is graph of the irradiance of a xenon lamp.

A method is provided for forming a liquid crystal alignment layer. The method includes the steps of: disposing liquid crystals in a solvent; depositing the liquid crystals and solvent on a substrate; removing the solvent to form a liquid crystal film; and irradiating the liquid crystal film with light wherein the wavelength of the light overlaps the absorption spectrum of the liquid crystal.

The liquid crystal that can be used to form the liquid crystal layer can be any liquid crystal with molecules that have dichroic absorption matched to the irradiating wavelength and which undergo a photochemical transformation. Examples of photochemical transformation include, but are not limited to, cis-trans photoisomerization, photo-induced absorption or desorption, or photochemical reaction.

Generally, wavelengths of light in the UV region of the spectrum are used because liquid crystal molecules generally absorb light in the UV wavelengths.

Suitable examples of the liquid crystal include, but are not limited to, 4-cyano4'-alkylbiphenyls, 4-cyano4'-alkyloxybiphenyls, 4alkyl-4'alkoxy-azoxybenzenes. Specific examples of compounds within these families are 4-cyano-4'-pentylbiphenyl, 4-cyano-4'-hexyloxibiphenyl and 4-butyl-4'metoxy-azoxybenzene.

Commercial mixtures containing all the above can be also used. Illustrative are the mixture E7 from BDH, Ltd. UK and the mixture ZLI 4792 from Merk, USA.

The liquid crystal alignment layer ranges from about a thickness that corresponds to the monolayer of LC molecules on substrate), which is about 2 nm, to about 0.1 $\mu$m in thickness. Preferably, the liquid crystal alignment layer ranges from about 2 nm to about 20 nm in thickness.

The irradiating light of the present invention must contain a linearly polarized component, i.e. must be either linearly polarized or elliptically polarized, or partially polarized. Most preferably, the irradiating is providing by linearly polarized light. The irradiating light must have a wavelength in the absorption band of the aligning liquid crystal layer. Typically, the light will be in the ultraviolet range as the liquid crystal compounds have peak absorbtion in this range. Preferably, the light will have a wavelength within the range of about 200 to about 350 nm. The most preferred source of light is Hg- or Xe-lamps.

The direction of the easy axis is given by the polarization of the irradiating light (in most cases the easy axis is perpendicular to the polarization of the irradiating light). Therefore, the direction of the easy axis can be locally varied across the alignment layer by changing the direction of light polarization in the range 0–360°. The value of the anchoring energy is given by the irradiating intensity and exposure. Therefore, the anchoring energy can be locally varied across the alignment layer by changing the direction of light polarization and the time of the exposure. The typical range of the variety of the anchoring energy is about $10^{-4}$–$10^{-2}$ erg/cm$^2$. Exposure times and light intensities vary widely with the materials and light source used and can range from about tens of seconds to about several hours.

Prior to irradiating, a mask may be placed over the liquid crystal film. The mask is removed after the film is irradiated. The mask can be any desired shape to provide a pattern to the liquid crystal film.

The liquid crystal film can be deposited on the substrate by any method. Suitable examples of depositing the film are spin coating and dip coating. For spin coating, the liquid crystal is dissolved in a solvent. The solvent can be any solvent that will dissolve the liquid crystal. Suitable examples of the solvent include, but are not limited to, aliphatic hydrocarbons ( such as, hexane, octane, cyclohexane) aromatic hydrocarbons (such as, benzene, toluene, chlorobenzene), ethers (such as, ethylene glycol dimethylether, 1,4-dioxane, tetrahydrofuran), esters (such as, ethyl acetate, butyl acetate, diethyl carbonate,) ketones (such as, acetone, cyclohexanone, 2-butanone), and alcohols (such as; 2-propanol, ethanol, methanol). The solvent can be removed by any method, including evaporation at room temperature or with applied heat.

The substrate can be any material commonly used for fabricating liquid crystal cells. Materials such as glass, quartz or plastic can be used. The substrate materials can also be any materials commonly used for fabricating chips, for example silicon.

Figure 4:
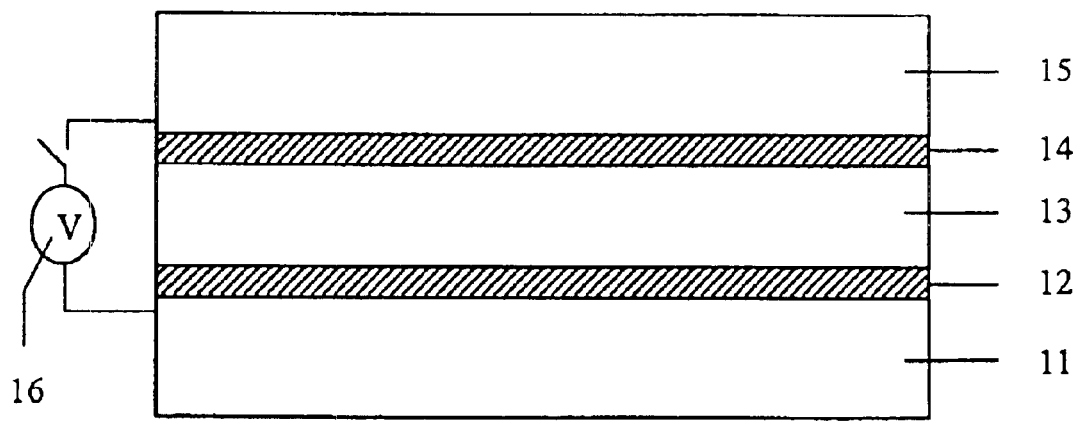
FIG. 4 is a schematic of a liquid crystal cell.

The liquid crystal alignment layer can then be incorporated into a liquid crystal cell. A liquid crystal cell typically comprises opposed substrates, electrodes on the substrates, alignment layers disposed over the electrodes, spacers between the substrates to control the thickness of the liquid crystal cell, and liquid crystals disposed between the substrates. FIG. 4 is a schematic of a typical liquid crystal cell. Layers 11 and 15 represent the combined substrate and electrodes. Layers 12 and 14 represent the alignment layers. Layer 13 represents the liquid crystal material. And, layer 16 is a voltage source to power the cell.

The liquid crystal alignment layer can be placed on one or both of the substrates in the liquid crystal cell. When the liquid crystal alignment layer is placed on only one of the substrates, any known alignment material may be placed on the remaining substrate. Other alignment materials include, but are not limited to, rubbed or light-irradiated polyimides rubbed polyvinyl-alcohol, light-irradiated polyvinyl-cinnamate, light-irradiated polysiloxane-cinnamates, oblique evaporated $A_2O_3$.

The electrodes of the liquid crystal cell can be fabricated from any material known to be used for electrodes for liquid crystal cells. Suitable materials for the electrodes include, but are not limited to, indium-tin-oxide (ITO), stannic oxide $SnO_2$, aluminum, chrornium, silver, or gold.

Additional information relating to the invention can be found in "Photoaligruneut of Liquid Crystals by Liquid Crystals" by Reznikov et al., Physical Review Letters, Volume 84, Number 9, 28 February 2000, pages 1930–1933, which is incorporated herein by reference.

SPECIFIC EMBODIMENTS OF THE INVENTION

Example 1

The liquid crystal mixture ZLI 4792, from Merck, was dissolved in hexane at a weight concentration of 0.5%. A droplet of this solution was deposited on a rectangular glass substrate and spin-coated for 20 seconds at 3000 rpm. Then the substrate was warmed to 50° C. on a hot stage and maintained for 30 minutes. A uniform liquid crystal film with a thickness of less than 1 μm was produced on the substrate.

Figure 2:
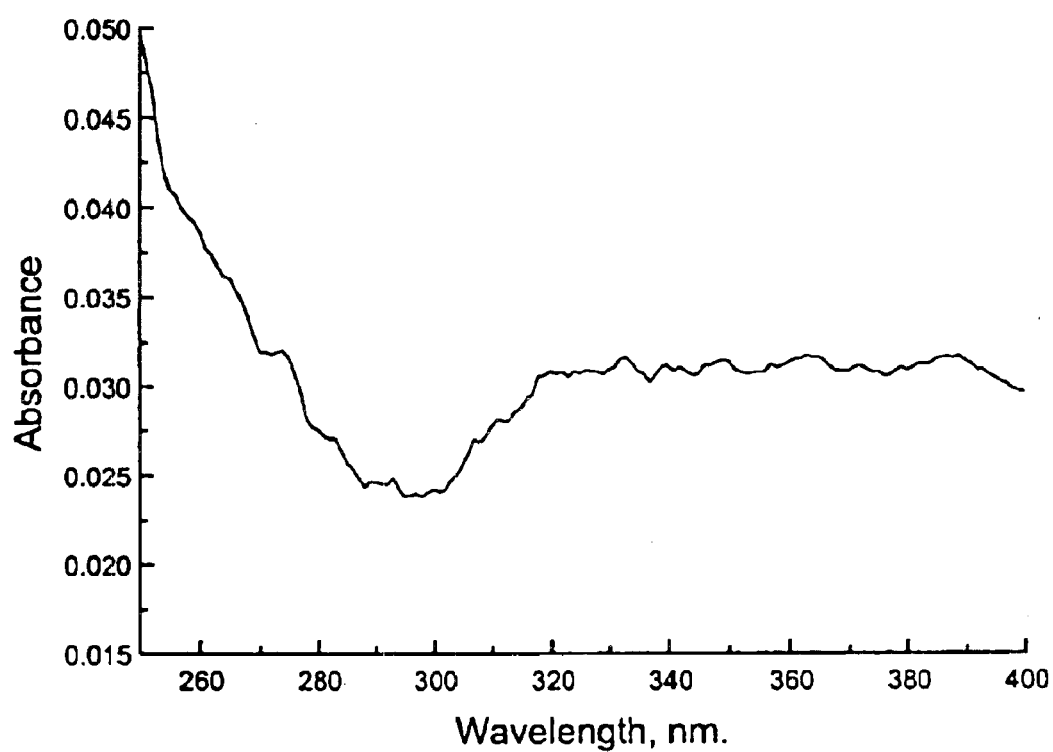
FIG. 2 is a graph of the absorption of the film of a liquid crystal mixture ZLI-4792 from Merck deposited on a substrate.

A portion of the liquid crystal film was irradiated with polarized UV light from a Xe-lamp. The irradiation spectrum of the lamp (FIG. 1) overlaps the absorption spectrum of the liquid crystal film (FIG. 2). The spectrum of the liquid crystal deposited on the substrate is different from the spectrum of the bulk liquid crystal because of the interaction between the liquid crystal and the substrate. The film was exposed for 20 minutes at an intensity of 5 mW/cm². The polarization of the UV-light, E, was parallel to the long side of the glass substrate.

The glass substrate from above and another glass substrate with a rubbed layer of polyimide, NISSAN 7792 from Nisssan, were used to form a liquid crystal cell. The direction of rubbing on the substrate covered with the polyimide was parallel to the long side of the substrate. The substrates were separated by rigid 20μm spacers. The resulting cell was warmed to 100° C. and filled with the liquid crystal ZLI 4792.

Figure 3:
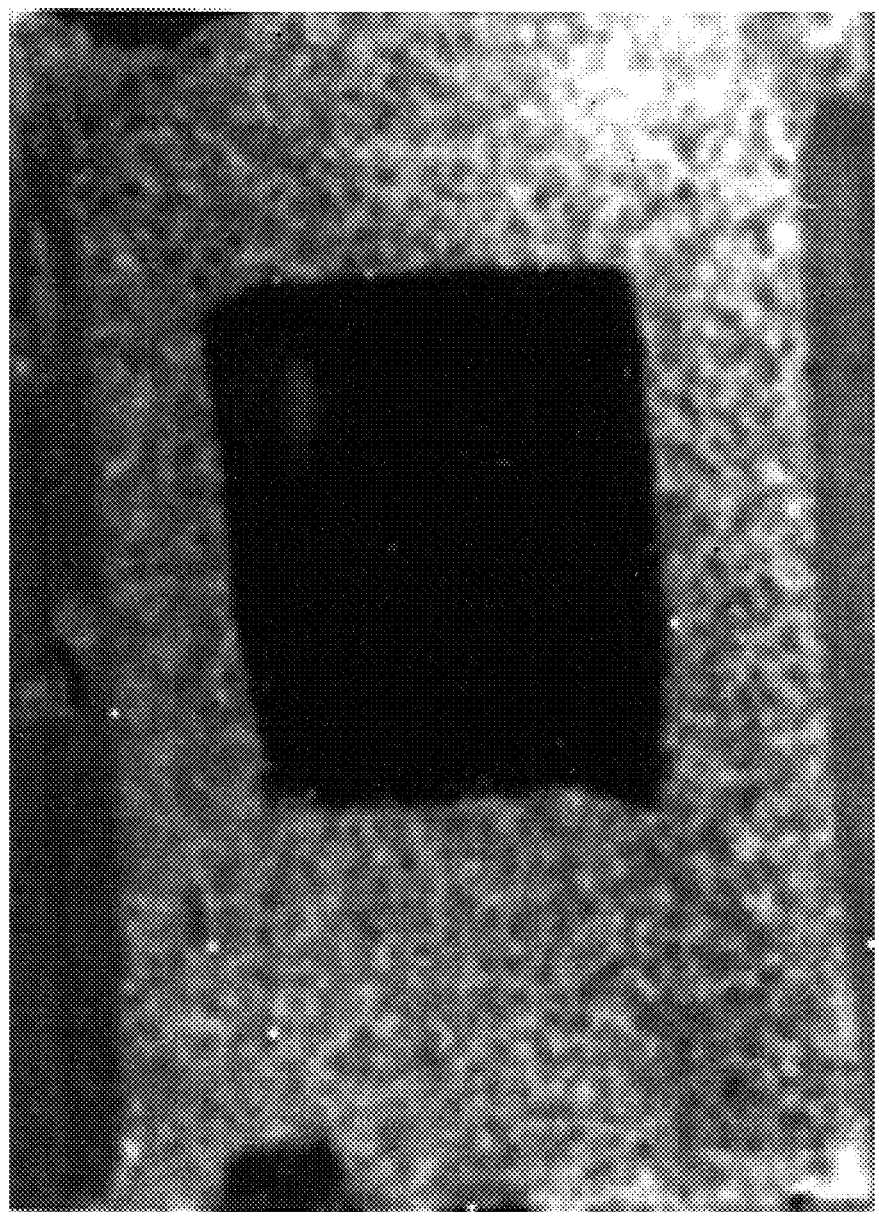
FIG. 3 is a photomicrograph that shows the alignment in a liquid crystal cell that was prepared in Example 1.

The cell showed poor alignment with a quasi-planar liquid crystal texture in the non-irradiated area and a high quality twisted-planar alignment in the irradiated area (FIG. 3). The director on the liquid crystal aligning layer aligned approximately perpendicular to the polarization of the irradiating UV light. Thermal treatment (130° C. for 1 hour) did not change the liquid crystal alignment in the irradiated area.

Example 2

The same procedure as described in Example 1 was used except that the cell was filled with the liquid crystal 4-cyano4'-pentylbiphenyl (K15) from Merck. The cell showed poor alignment with a quasi-planar liquid crystal texture in the non-irradiated area and a high quality weakly twisted planar alignment in the irradiated area. Thermal treatment (130° C. for 1 hour) did not change the liquid crystal alignment in the irradiated area.

Example 3

The same procedure was used as described in Example 1 except that the liquid crystal that was spin coated on the glass substrate and used for alignment was K15, and the cell was filled with the liquid crystal K15. The cell showed poor alignment with a quasi-planar liquid crystal texture in the non-irradiated area and a high quality homeotropic alignment in the irradiated area. Thermal treatment (130° C. for 1 hour) did not change the liquid crystal alignment in the irradiated area.

Example 4

The same procedure as described in Example 3 was used but the K15 film was produced as described below.

The liquid crystal K15 was dissolved in isopropyl alcohol at a weight concentration of 0.2%. A chemically clean rectangular quartz substrate was put in this solution and maintained for 45 minutes. The substrate was taken out of the solution, washed in isopropyl alcohol for 20 seconds, and dried by a nitrogen gas stream to remove the solvent. As a result, a uniform liquid crystal film with a thickness comparable the thickness of the K15 monolayer was produced on the substrate.

The cell showed poor alignment with a quasi-planar liquid crystal texture in the non-irradiated area and a good quality twisted-planar alignment in the irradiated area. The director on the liquid crystal aligning layer was aligned 30° to the direction of rubbing on the surface covered with rubbed polyimide layer.

Example 5

The same procedure as described in Example 1 was used except the glass substrates were covered with the liquid crystal K15 and the cell was filled with the liquid crystal ZLI4792. The cell showed poor alignment with a quasi-planar liquid crystal texture in the non-irradiated area and a high quality twisted planar alignment in the irradiated area. The director on the LC aligning layer aligned parallel to the rubbing direction of polyimide surface. Thermal treatment (130° C. for 1 hour) did not change the liquid crystal alignment in the irradiated area.

Example 6

The same procedure as described in Example 1 was used except the glass substrates were covered with the liquid crystal K15 and the cell was filled with the liquid crystal 4-butyl-4'metoxy-azoxybenzene (from Niopic, Russia). The cell showed poor alignment with a quasi-planar liquid crystal texture in the non-irradiated area and a high quality twisted planar alignment in the irradiated area. The director on the liquid crystal aligning layer aligned parallel to the rubbing direction of polyimide surface. Thermal treatment (130° C. for 1 hour) did not change the liquid crystal alignment in the irradiated area.

Example 7

The same procedure as described in Example 1 was used except the liquid crystal K15 was deposited on a layer of a non-photosensitive polyimide, given by the following structure:

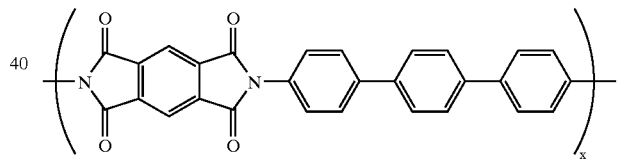

wherein x is a number from about 15,000 to about 70,000. The cell was filled with the liquid crystal K15. The cell showed poor alignment with a quasi-planar liquid crystal texture in the non-irradiated area and a high quality twisted-planar alignment in the irradiated area. The director on the liquid crystal aligning layer aligned approximately perpendicular to the polarization of the irradiating UV light. Thermal treatment (130° C. for 1 hour) did not change the liquid crystal alignment in the irradiated area.

Example 8

The same procedure as described in Example 1 was used except that the liquid crystal K15 was deposited on a layer of a non-photosensitive polyimide, see Example 7, and the cell was filled with the liquid crystal ZLI 4792. The cell showed poor alignment with a quasi-planar liquid crystal texture in the non-irradiated area and a high quality twisted-planar alignment in the irradiated area. The director on the liquid crystal aligning layer aligned approximately perpendicular to the polarization of the irradiating UV light. Thermal treatment (130° C. for 1 hour) did not change the liquid crystal alignment in the irradiated area.

Example 9

The same procedure as described in Example 1 was used except that the liquid crystal K15 was deposited on a transparent conductive layer of indium tin oxide (ITO) and the cell was filled with the liquid crystal ZLI 4792. The cell showed a poor quasi-planar liquid crystal texture in the non-irradiated area and a high quality planar-twisted alignment in the irradiated area. The director on the liquid crystal aligning layer aligned approximately perpendicular to the polarization of the irradiating UV light. Thermal treatment (130° C., 1 hour) did not change the liquid crystal alignment in the irradiated area.

It should be appreciated that the present invention is not limited to the specific embodiments described above, but includes variations, modifications and equivalent embodiments defined by the following claims.

What is claimed is:

1. A method for forming a liquid crystal alignment layer for use in a liquid crystal cell having liquid crystal filled between first and second substrates of the cell, said method comprising:

forming a liquid crystal film on at least one of the first or second substrates, the liquid crystal film comprising liquid crystals and having a thickness which is smaller than a thickness of the liquid crystal filled cell; and irradiating the liquid crystal film with light wherein the wavelength of the light at least partially overlaps the absorption spectrum of the liquid crystals to form an alignment layer of liquid crystals.

2. The method of claim 1, wherein the liquid crystal film is formed by one of spin coating and dip coating.

3. The method of claim 1, wherein the liquid crystal film has a thickness ranging from about 2 nm to about 0.1 micrometer.

4. The method of claim 1, wherein the liquid crystal film has a thickness ranging from about 2 nm to about 20 nm.

5. The method of claim 1 further comprising laying a patterned mask over the liquid crystal film prior to the irradiating step and removing the mask after the irradiating step.

6. The method of claim 1, wherein the liquid crystal is selected from the group consisting of 4-cyano-4'-alkylbiphenyl, 4-cyano-4'-alkyloxybiphenyls, 4-alkyl-4'alkoxy-azoxybenzenes and mixtures thereof.

7. The method of claim 1, wherein the liquid crystal film has an easy axis of orientation and an anchoring energy, wherein at least one of the easy axis of orientation and anchoring energy is locally varied across the liquid crystal film by at least one of exposure time of the light at a point on the liquid crystal film and polarization of the light at a point on the liquid crystal film.

8. The method of claim 7, wherein the direction of the easy axis can be locally varied across the alignment layer from 0° to 360°.

9. The method of claim 7, wherein the anchoring energy ranges from about $10^{-4}$ to about $10^{-2}$ erg/cm$^2$.

10. The method of claim 1, wherein said method comprises a step in a method of forming a liquid crystal cell.

11. The method of claim 10, comprising:

providing two opposed substrates each having an electrode;

disposing first liquid crystals in a solvent;

depositing the first liquid crystals and solvent on at least one of the substrates on the surface facing the other substrate;

removing the solvent to form a liquid crystal film;

irradiating the liquid crystal film with light wherein the wavelength of the light that at least partially overlaps the absorption spectrum of the liquid crystal;

placing spacers between the substrates;

sealing three of the sides of the substrate to form a cell;

filling the cell with second liquid crystals; and sealing the cell.

12. A method of forming a liquid crystal cell having liquid crystal filled between first and second substrates, said method comprising:

providing two opposed substrates each having an electrode, said two opposed substrates being said first and second substrates;

forming a first liquid crystal film on at least one of the first and second substrates on the surface facing the other substrate, the liquid crystal film comprising first liquid crystals and having a predetermined thickness which is smaller than a thickness of the liquid crystal filled cell;

irradiating the liquid crystal film with light prior to filling the cell with second liquid crystal, wherein the wavelength of the light at least partially overlaps the absorption spectrum of the liquid crystal film;

placing spacers between the substrates;

sealing three of the sides of the substrate to form a cell;

filling the cell with said second liquid crystal subsequent to the step of irradiating the liquid crystal film such that only the liquid crystal film on the at least one substrate is irradiated; and sealing the cell.

13. The method of claim 12, wherein the liquid crystal film is formed by one of spin coating and dip coating.

14. The method of claim 12, wherein the liquid crystal film has a thickness ranging from about 2 nm to about 0.1 micrometer.

15. The method of claim 12, wherein the liquid crystal film is formed by disposing liquid crystals in a solvent, depositing the combination on the substrate and removing the solvent.

16. The method of claim 12 further comprising laying a patterned mask over the liquid crystal film prior to the irradiating step and removing the mask after the irradiating step.

17. The method of claim 12, wherein the first liquid crystal has an easy axis of orientation and an anchoring energy, wherein at least one of the easy axis of orientation and anchoring energy is locally varied across the liquid crystal film by at least one of exposure time of the light at a point on the liquid crystal film and polarization of the light at a point on the liquid crystal film.

18. The method of claims 12, wherein the first liquid crystal is selected from the group consisting of 4-cyano-4'-alkylbiphenyls, 4-cyano-4'-alkyloxybiphenyls, 4-alkyl-4'alkoxy-azoxybenzenes, and mixtures thereof.

19. The method of claim 17, wherein the first and second liquid crystals have the same molecular structure.

20. The method of claim 17, wherein the liquid crystal film is formed from a liquid crystal medium coated on the substrate to a predetermined thickness.

21. The method of claim 12, wherein a further alignment layer is disposed on one of the substrates.

22. The method of claim 21, wherein the further alignment layer is selected from the group consisting of rubbed polyimides, light-irradiated polyimides, rubbed polyvinyl-aliquid crystalohol, light-irradiated polyvinyl-cinnamate, light-irradiated polysiloxane-cinnamates, and oblique evaporated $Al_2O_3$.

23. A liquid crystal cell made according to the method of claim 12.

24. A liquid crystal display comprising a first and second cell wall structures, electrodes disposed on facing sides of said first and second cell wall structures, an alignment layer disposed on at least one of said electrodes, and first liquid crystals disposed within a space between the first and second cell wall structures, wherein the alignment layer comprises a liquid crystal film of second liquid crystals, wherein the liquid crystal film has been irradiated with light, prior to disposing the first liquid crystals in a space between the first and second cell wall structure, wherein said light at least partially overlaps the absorption spectrum of the second liquid crystals.

* * * * *